US011416176B2

(12) United States Patent
Agarwal

(10) Patent No.: US 11,416,176 B2
(45) Date of Patent: Aug. 16, 2022

(54) FUNCTION PROCESSING USING STORAGE CONTROLLERS FOR LOAD SHARING

(71) Applicant: Western Digital Technologies, Inc., San Jose, CA (US)

(72) Inventor: Dinesh Kumar Agarwal, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 122 days.

(21) Appl. No.: 16/909,563

(22) Filed: Jun. 23, 2020

(65) Prior Publication Data
US 2021/0397374 A1    Dec. 23, 2021

(51) Int. Cl.
*G06F 3/06* (2006.01)
*G06F 9/54* (2006.01)
*G06F 9/48* (2006.01)
*G06F 9/50* (2006.01)

(52) U.S. Cl.
CPC .......... *G06F 3/0659* (2013.01); *G06F 3/0604* (2013.01); *G06F 3/0629* (2013.01); *G06F 3/0683* (2013.01); *G06F 9/485* (2013.01); *G06F 9/505* (2013.01); *G06F 9/542* (2013.01); *G06F 2209/5022* (2013.01)

(58) Field of Classification Search
None
See application file for complete search history.

(56) References Cited

U.S. PATENT DOCUMENTS

| 10,303,384 | B1* | 5/2019 | Agarwal | G06F 3/0659 |
| 2011/0004881 | A1* | 1/2011 | Terechko | G06F 9/4881 718/102 |
| 2014/0109102 | A1* | 4/2014 | Duncan | G06F 9/4881 718/103 |
| 2015/0319243 | A1* | 11/2015 | Hussain | G06F 3/0665 709/217 |
| 2017/0286157 | A1* | 10/2017 | Hasting | G06F 9/5038 |
| 2018/0217935 | A1* | 8/2018 | Zhang | G06F 12/0868 |

OTHER PUBLICATIONS

Burt, J., Making Remote NVM-Express Flash Look Local and Fast, The Next Platform, Mar. 1, 2017 (8 pages).
Dean, J., et al., MapReduce: Simplified Data Processing on Large Clusters, Google, Inc., USENIX Association OSDI '04: 6th Symposium on Operating Systems Design and Implementation, 2004, p. 137-149.
Lu, X., High-Performance Big Data Analytics with RDMA over NVM and NVMe-SSD, Talk at OFA Workshop, 2018 (33 pages), Ohio State University.

* cited by examiner

*Primary Examiner* — Elias Mamo
(74) *Attorney, Agent, or Firm* — Patent Law Works LLP

(57) ABSTRACT

Systems and methods for distributed storage and processing systems using storage controllers for load sharing are described. A host processor may receive a function request that corresponds to a plurality of compute tasks, such as map compute tasks targeting data in local storage. The host processor may fetch the data from local storage devices through storage controllers. At least one storage controller, such as a non-volatile memory express (NVMe) interface controller, may be configured to execute overflow tasks for the function request. Another storage controller may be configured for executing other processing and management activities, such as reduce compute tasks.

20 Claims, 7 Drawing Sheets

FUNCTION PROCESSING USING STORAGE CONTROLLERS FOR LOAD SHARING

TECHNICAL FIELD

The present disclosure generally relates to distributed data storage systems and, more particularly, to processing data functions for distributed computing.

BACKGROUND

Often, distributed storage systems are used to store large amounts (e.g., terabytes, petabytes, exabytes, etc.) of data, such as objects, blocks, or files in a distributed and fault tolerant manner with a predetermined level of redundancy. It may be advantageous to process this data using distributed computing that divides large processing tasks into smaller tasks handled by multiple computers, ideally with proximity to the data being processed.

These large-scale storage systems may support the processing of stored data within storage nodes and/or storage devices to support applications, such as video encoding and decoding, machine learning, etc. The compute tasks that make up such processing may be distributed across host systems, with each host system accessing locally stored data to limit the amount of data that needs to be transferred to the host system and/or conserve other host system resources. In some configurations, the host system may be assigned a volume of data to be processed and a target processing time calculated to meet required service levels and/or synchronize with other host systems executing other parts of a larger processing task. For example, a host computer may be tasked with a map-reduce function targeting a particular set of data units stored in a storage node local to the host system.

In the map step, a master node takes large problem or function input, slices it into smaller sub-problems, and distributes these to worker nodes. Each worker node, generally a host system, processes the smaller problem and passes the resulting data back to the master node. In the reduce step, the master node takes the answers to the sub-problems and combines them in a predefined way to get the output or answer to the original problem or function. In some cases, the process may involve multiple layers of map and reduce processes with host systems acting as masters, mappers, and/or reducers at different times. For example, a master host system or application may identify a group of other systems to act as workers for the map step, each processing a series of input data units and generating intermediate data. The intermediate data may be passed to one or more other host systems to execute the reduce step and generate output data. This output data may be collected by the master node or application.

The host computer may bear the burden of assuring that the processing tasks assigned to it are completed within the requested processing time and may identify portions of the requested function that cannot be completed by the host computer alone in a timely fashion. These overflow tasks may need to be outsourced to another host computer, by sending the locally stored data over a network to the other host, or may be completed by the host but in violation of the requested processing time. Due to the lack of availability of other hosts and network delays, neither outsourcing to other hosts nor computing the overflow tasks using the host processor may reliably result in meeting the requested processing time.

Some host computers may be supported by a storage system that includes one or more storage nodes configured with storage controllers for accessing storage devices. In some configurations, the host computer will use a memory access protocol to access the data for processing in the storage devices of the storage nodes. Various standards have been defined for enabling host software and systems to communicate with storage subsystems, such as non-volatile memory subsystems or solid-state drives (SSDs). An example standard may include Non-Volatile Memory Express (NVMe). NVMe interface controllers may be configured with processing capabilities to manage the memory access protocols between the host computer and the storage devices over a bus or backplane that avoids general network traffic.

As large-scale storage systems scale, transfer of large data sets for data operations may be inefficient. A need exists for at least storage systems that execute data functions, such as map-reduce functions, with reduced data transfers and improved efficiency and reliability.

SUMMARY

Various aspects for distributed storage systems for function processing, particularly using storage controllers for load sharing, are described.

One general aspect includes a system that includes a host processor configured to: receive a function request, the function request including a plurality of compute tasks; fetch, from at least one storage device, input data for a host subset of the plurality of compute tasks; execute the host subset of the plurality of compute tasks; and return, based on the plurality of compute tasks, a function result. The system also includes a first storage controller configured to: provide access to the at least one storage device for the host processor to fetch the input data, and execute at least one overflow compute task from the plurality of compute tasks.

Implementations may include one or more of the following features. The first storage controller may be further configured to: receive a requested processing time; and determine the at least one overflow compute task from the plurality of compute tasks based on the host subset of the plurality of compute tasks and a requested processing time for the function request. The host processor may be further configured to: receive, with the function request, the requested processing time; determine, based on the requested processing time, the host subset of the plurality of compute tasks; and send, to the first storage controller the requested processing time and the host subset of the plurality of compute tasks. The first storage controller may include: a first controller processor configured to execute the at least one overflow compute task from the plurality of compute tasks; and a storage device interface to a plurality of storage devices, including the at least one storage device. The first storage controller may be further configured to: fetch, from the at least one storage device, the input data for the plurality of compute tasks through the storage device interface; send, to the host processor, the input data for the host subset of the plurality of compute tasks; and process the input data for the at least one overflow compute task to execute the at least one overflow compute task. The first storage controller may be further configured to: fetch the input data from a first namespace; and store, responsive to executing the at least one overflow compute task, overflow task intermediate data in a second namespace. The host processor may be further configured to store, responsive to executing the host subset of the plurality of compute tasks, host task intermediate data in the second namespace. The system may further include a second storage processor configured to: provide access to the at least one storage device for the host processor; fetch function intermediate data generated from the plurality of compute tasks; execute, using the function intermediate data, at least one reduce compute task to generate function output data; and store the function output data in the at least one storage device, where the function result returned by the host processor is based on the function output data. The first storage controller may be further configured to store, responsive to executing the at least one overflow compute task, overflow task intermediate data in a second namespace. The host processor may be further configured to store, responsive to executing the host subset of the plurality of compute tasks, host task intermediate data in the second namespace. The function intermediate data may include the overflow task intermediate data and the host task intermediate data. The second storage controller may be further configured to store the function output data in a third namespace and send an output data notification to the host processor. The host processor may be further configured to return, responsive to the output data notification, the function result using the function output data in the third namespace. Executing the host subset of the plurality of compute tasks may generate host task intermediate data. The host processor may be further configured to: evaluate a size of the host task intermediate data against a size threshold; selectively store, responsive to the size threshold being met, the host task intermediate data to the at least one storage device; and selectively send, responsive to the size threshold not being met, the host task intermediate data to the second storage controller. The function intermediate data may include the host task intermediate data. The first storage controller may be configured as a master non-volatile memory express controller for accessing a shared namespace in the at least one storage device. The second storage controller may be configured as a secondary non-volatile memory express controller for accessing the shared namespace in the at least one storage device. The plurality of compute tasks may be map tasks for a map-reduce function and each of the plurality of compute tasks may operate on a data unit of the input data from the shared namespace. The second storage controller may be further configured to send, responsive to receiving intermediate data for each compute task of the plurality of compute tasks, a progress notification to the host processor.

Another general aspect includes a computer-based method that includes: receiving, at a host processor, a function request, the function request including a plurality of compute tasks; accessing, though a first storage controller, at least one storage device; fetching, by the host processor and from at least one storage device, input data for a host subset of the plurality of compute tasks; executing, by the host processor, the host subset of the plurality of compute tasks; executing, by the first storage controller, at least one overflow compute task from the plurality of compute tasks; and returning, based on the plurality of compute tasks, a function result.

Implementations may include one or more of the following features. The computer-based method may include: receiving a requested processing time for the function request; and determining the at least one overflow compute task from the plurality of compute tasks based on the host subset of the plurality of compute tasks and the requested processing time for the function request. The computer-based method may include determining, based on the requested processing time, the host subset of the plurality of compute tasks. The computer-based method may include: fetching, from the at least one storage device and to the first storage controller, the input data for the plurality of compute tasks; sending, from the first storage controller to the host processor, the input data for the host subset of the plurality of compute tasks; and processing, by the first storage controller, the input data for the at least one overflow compute task to execute the at least one overflow compute task. The computer-based method may include: fetching the input data for the plurality of compute tasks from a first namespace; storing, responsive to executing the at least one overflow compute task, overflow task intermediate data in a second namespace; and storing, responsive to executing the host subset of the plurality of compute tasks, host task intermediate data in the second namespace. The computer-based method may include: providing, from a second storage controller, access to the at least one storage device for the host processor; fetching, by the second storage controller, function intermediate data generated from the plurality of compute tasks; executing, by the second storage controller and using the function intermediate data, at least one reduce compute task to generate function output data; and storing the function output data in the at least one storage device, where the function result returned is based on the function output data. The computer-based method may include: storing, responsive to executing the at least one overflow compute task, overflow task intermediate data in a second namespace; and storing, responsive to executing the at least one overflow compute task, overflow task intermediate data in a second namespace, where the function intermediate data includes the overflow task intermediate data and the host task intermediate data. The computer-based method may include: storing the function output data in a third namespace; and sending, by the second storage controller, an output data notification to the host processor; and returning, responsive to the output data notification, the function result using the function output data in the third namespace. Executing the host subset of the plurality of compute tasks may generate host task intermediate data and the function intermediate data may include the host task intermediate data. The computer-based method may include: evaluating a size of the host task intermediate data against a size threshold; selectively storing, responsive to the size threshold being met, the host task intermediate data to the at least one storage device; and selectively sending, responsive to the size threshold not being met, the host task intermediate data to the second storage controller.

Still another general aspect includes a system that includes: a host processor; a plurality of storage devices; a first storage controller configured for the host processor to access data on the plurality of storage devices; a second storage controller configured for the host processor to access data on the plurality of storage devices; means for receiving, at the host processor, a function request, the function request including a plurality of compute tasks; means for fetching, by the host processor and from at least one storage device, input data for a host subset of the plurality of compute tasks; means for executing, by the host processor, the host subset of the plurality of compute tasks; means for executing, by the first storage controller, at least one overflow compute task from the plurality of compute tasks; means for fetching, by the second storage controller, function intermediate data generated from the plurality of compute tasks; means for executing, by the second storage controller and using the function intermediate data, at least one reduce compute task to generate function output data; means for storing the function output data in the at least one storage device; and means for returning a function result based on the function output data.

The various embodiments advantageously apply the teachings of distributed storage networks and/or systems to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the processing of distributed functions by host systems, such as by using the processing capabilities of storage controllers close to the target data to offload overflow tasks and lower intensity compute and management tasks. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
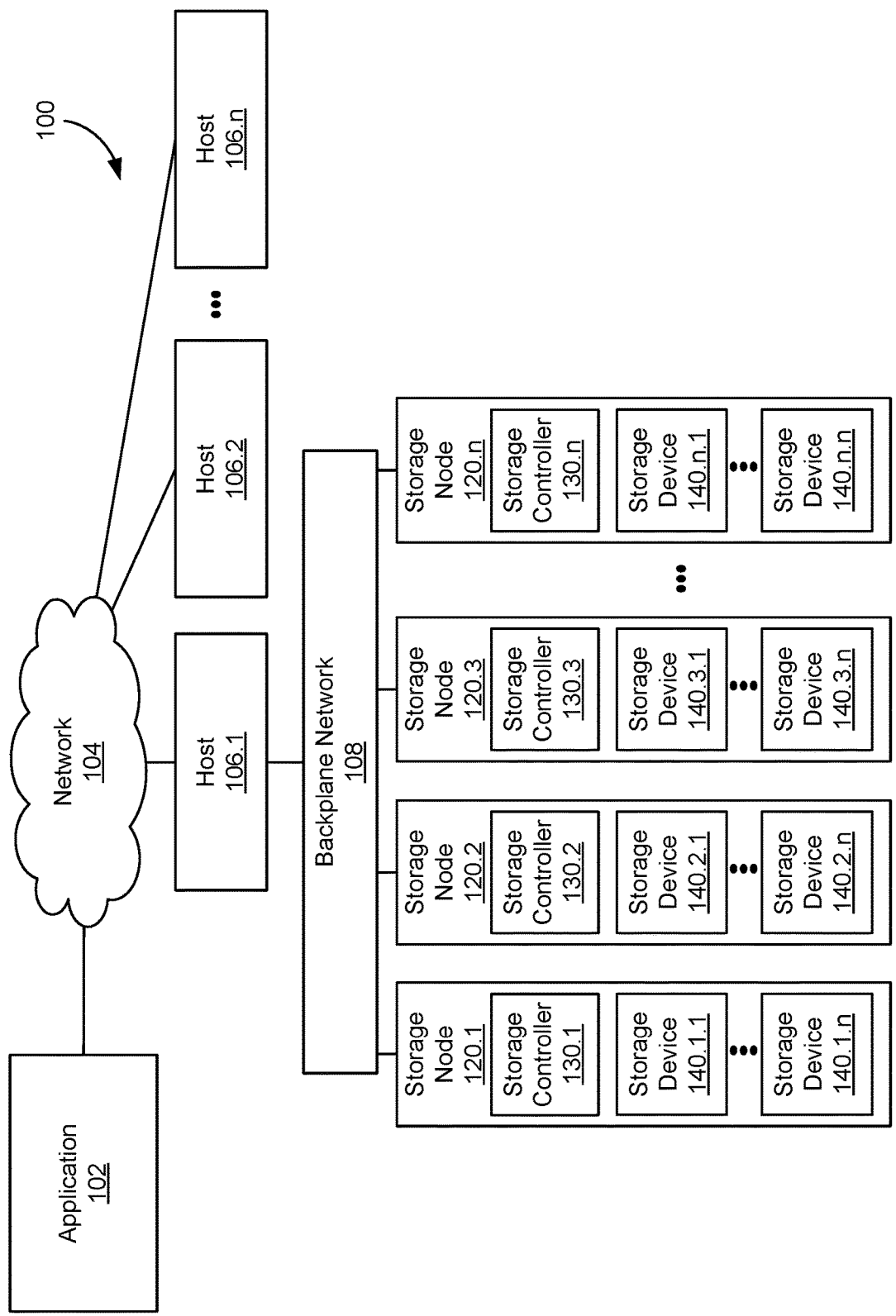
FIG. 1 schematically illustrates a distributed storage and processing system.

FIG. 1 shows an embodiment of an example data storage system 100 with distributed processing capabilities. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or disk drives) configured in storage nodes 120. In some embodiments, storage nodes 120 may be configured as blades, rack servers, storage arrays, or similar storage units for use in data center storage racks or chassis. Storage nodes 120 may support one or more applications 102 and provide data storage and retrieval capabilities for host systems 106. In some embodiments, storage nodes 120 may be configured in a distributed storage hierarchy that supports hosts 106. Each host 106 may be responsible for a corresponding set of storage nodes and storage devices, though only storage nodes 120 and storage devices 140 for controller 106.1 are shown.

In the embodiment shown, each storage node 120 includes a number of storage devices 140 attached to a backplane network 108. For example, storage devices 140 may include a number of disk drives arranged in a storage array, such as storage devices sharing a common rack, unit, or chassis in a data center. In some embodiments, storage devices 140 may share backplane network 108, network switch(es), and/or other hardware and software components for connecting to host 106.1 over an isolated network that does not use the general network and interface bandwidth of host 106.1. For example, backplane network 108 may include a plurality of physical port connections to storage nodes 120, storage controllers 130, and/or storage devices 140 that define physical, transport, and other logical channels for establishing communication with the different components and subcomponents thereof. In some embodiments, the interconnections among host 106.1, storage nodes 120, storage controllers 130, and/or storage devices 140 may be configured as an interconnect fabric 114 supported by a fabric interconnect protocol, such as non-volatile memory express over fabric (NVMe-oF). In some embodiments, backplane network 108 may provide a plurality of physical connections to storage nodes 120 via storage controllers 130 that enable host 106.1 to access storage nodes 120 via a backplane network 108 and storage controllers 130. These physical connections may include one or more Ethernet connections, peripheral computer interface express (PCIe), fibre channel (FC), serial attached small computer storage interface (SAS), etc., as well as combinations thereof, and backplane network 108 may include a secure subnetwork through various network switches, network interfaces, and similar networking components.

Application 102 may be configured as an application or module in an information technology (IT) system for accessing storage system 100 to store, read, or otherwise manage data therein and/or request distributed function processing through one or more hosts 106. In some embodiments, application 102 may run on a computing system, such as a general-purpose computer configured as an application server, a personal computer, a laptop, a tablet, a wireless telephone, a personal digital assistant or any other type of communication device that is able to interface with the storage system 100 and/or hosts 106. In some embodiments, application 102 may include a web-based graphical user interface accessed through a web browser using secure internet protocols for accessing the distributed data processing functions of storage system 100.

In some embodiments, application 102 may divide data processing tasks across hosts 106, such that each host 106.1-106.n receives a subset of processing tasks in a function request related to a larger data processing project. In order to coordinate processing tasks among the hosts 106, application 102 may define a processing time for each phase of function requests issued to hosts 106. In some embodiments, application 102 may generally try to load balance the function requests across hosts 106 participating in the processing phase. In some instances, hosts 106 may have differing levels of processing capabilities and/or availability for the function requests, leading to variation the predicted processing time for each of hosts 106. In some instances, hosts 106 may be closer to or farther from the storage nodes containing the input data needed for the function request and/or the input data may be unevenly distributed among respective storage nodes such that one host is assigned more input data to process than another host. In some configurations, hosts 106 may be configured to determine that they cannot complete the compute tasks in the function request within the request processing time and may be configured to route overflow compute tasks in requests to other hosts.

In some embodiments, hosts 106 may be configured to leverage additional processing and communication capabilities within storage nodes 120 to support overflow compute tasks and/or other function processing tasks and avoid increasing traffic through network 104 and/or relying on the availability of other hosts 106. For example, when receiving a map-reduce function request, host 106.1 may load share overflow map compute tasks with one or more storage controllers 130 in storage nodes 120 and/or delegate the reduce function or function management responsibilities to one or more storage controllers 130. In some embodiments, at least two storage controllers 130 may be involved in load sharing for a function request and may operate as master and secondary storage controllers and/or mapper and reducer storage controllers.

Several storage nodes 120 can be grouped together with an associated host 106, such as storage nodes 120.1-120.n sharing a backplane connection through backplane network 108 with host 106.1. For example, these components may be housed in a single rack or chassis with associated backplane interfaces. Similarly, each host 106.2-106.n may be associated with another rack or chassis and another set of storage nodes. These racks may not be required to be located at the same location. They may be geographically dispersed across different data centers. For example, host 106.1 and associated storage nodes 120.1-120.n may be located in a rack at a data center in Europe, host 106.2 and associated storage nodes may be located in a rack at a data center in the USA, and host 106.n and associated storage nodes may be located in a rack at a data center in China. Similarly, these racks may be interconnected by a variety of network architectures and may include multiple network paths, global networks (e.g., internet), private networks, virtual networks, subnetworks, etc. and related networking equipment. These distributed rack components may be interconnected to network 104.

In some embodiments, the data storage devices 140 are, or include, solid-state drives (SSDs). Each data storage device 140.1.1-140.n.n may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with backplane network 108.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage controllers 130 may be coupled to respective data storage devices 140 through an interface bus within each storage node 120. For example, each storage mode may be configured as a storage blade or similar storage unit comprising a plurality of interface slots for storage devices 140. Storage controllers 130 may include NVMe interface cards with interface ports for NVMe compatible storage devices, such as storage devices with NVMe interfaces and onboard remote direct memory access (RDMA) engines. In some embodiments, storage controllers 130 may be coupled to respective data storage devices 140 through backplane network 108. However, in some embodiments, storage controllers 130 may be hosted as a component and/or a subsystem of another component of data storage system 100. For example, in some embodiments, some or all of the functionality of storage controllers 130 may be implemented by hardware and software for defining a protocol-based storage interface executed on one or more compute resources in at least one of data storage devices 140, backplane network 108, and/or physical interfaces or networking components thereof. Storage controllers 130 are sometimes called a controller system, a main controller system, a non-volatile memory express (NVMe) controller, garbage collection (GC) leader, or storage virtualization controller (SVC). In some embodiments, storage nodes 120 may include redundant storage controllers 130, such as a master controller and a secondary controller, for accessing the same set of storage devices 140.

In some embodiments, network 104 may include a wired and/or wireless network (e.g., public and/or private computer networks in any number and/or configuration) which may be coupled in a suitable way for transferring data. For example, network 104 may include any means of a conventional data communication network such as a local area network (LAN), a wide area network (WAN), a telephone network, such as the public switched telephone network (PSTN), an intranet, the internet, or any other suitable communication network or combination of communication networks. Data can be transferred between application 102 and hosts 106 and/or storage nodes 120, storage controllers 130, and storage devices 140 by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python or C, etc. Additionally, such hosts 106 may comprise additional high bandwidth Ethernet ports to interface with the storage nodes 130. In some embodiments, HTTP/REST protocols complying with S3 may enable data transfer through a REST application protocol interfaces (API). Preferably, hosts 106 may operate as a highly available cluster of host nodes, and provide, for example, shared access to and processing of the data in storage nodes 130.

Host systems 106 may be any suitable computer device, such as a computer, a computer server, a laptop computer, a tablet device, a netbook, an internet kiosk, a personal digital assistant, a mobile phone, a smart phone, a gaming device, or any other computing device with sufficient processing capabilities to execute compute tasks for the distributed function requests. Hosts 106 are sometimes called a host system, client, or client system. In some embodiments, hosts 106 are each a high-performance server system, such as a server system in a data center. In some embodiments, hosts 106 are configured in one or more host devices distinct from storage nodes 120, storage controllers 130, and the plurality of storage devices 140. The one or more hosts 106 may be configured to store and access data in the plurality of storage devices 140 through storage controllers 130.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

In some embodiments, backplane network 108 may include or employ one or more interfaces, routers, and physical connections to each component or subcomponent physically and logically connected to backplane network 108. In some embodiments, backplane network 108 may include a fabric network defined in terms of fabric nodes communicating with one another through backplane network 108 using a fabric network protocol, such as NVMe-oF. In some embodiments, fabric nodes may be organized as system nodes and subsystem nodes, where subsystem nodes include addressable storage resources and system nodes include subsystem management resources. Fabric network protocols may support a data connection to each subsystem fabric node, but typically conveys commands in addition to data, and optionally conveys metadata, error correction information and/or other information in addition to data values to be stored in storage devices 140 and data values read from storage devices 140.

In some embodiments, each storage device 140 includes a device controller, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
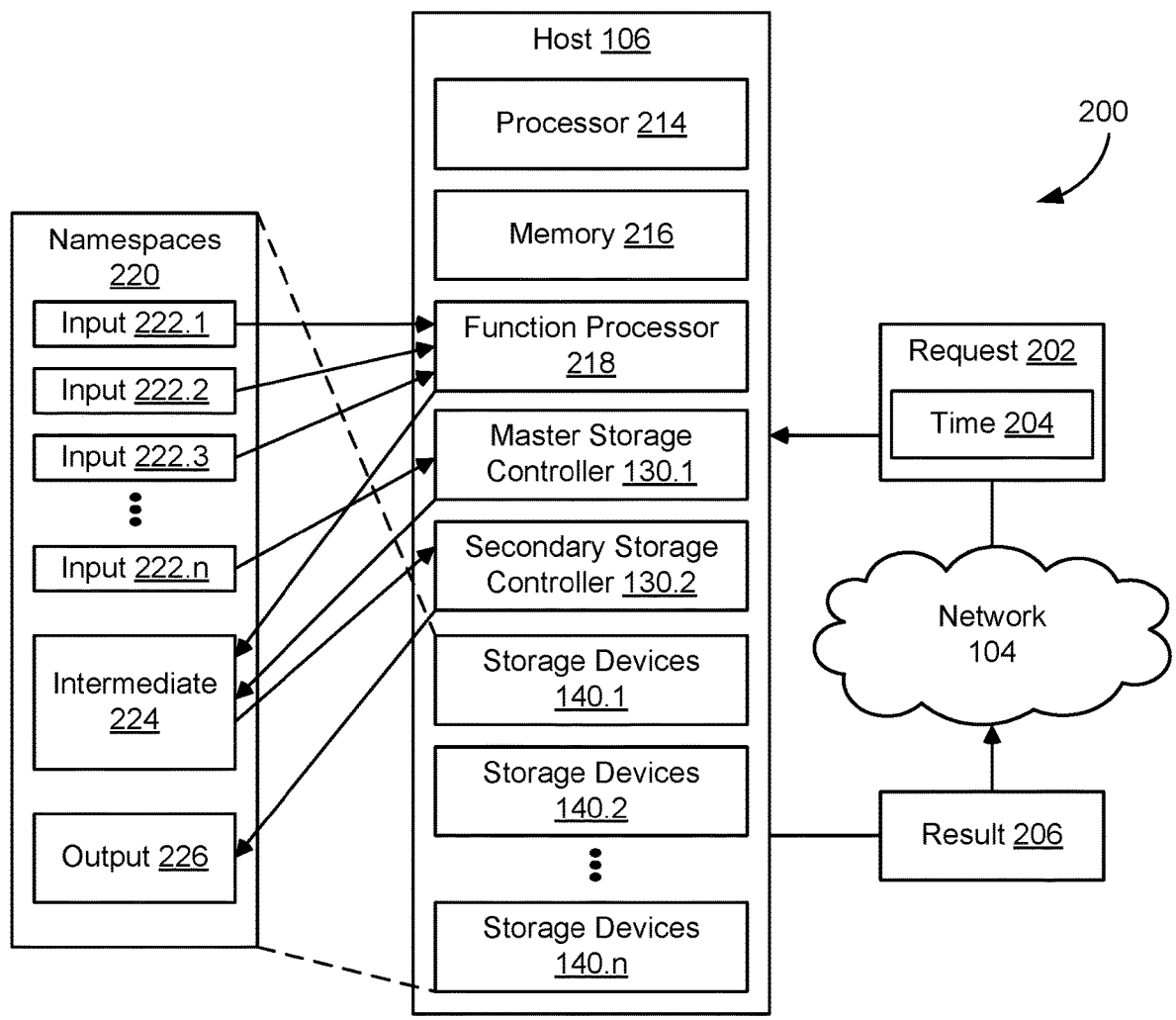
FIG. 2 schematically illustrates a host architecture for function processing that may be used by the system of FIG. 1.

FIG. 2 shows an embodiment of an example storage system 200, such as a host system 106 with associated storage controllers 130 and storage devices 140. In the configuration shown, host system 106 may receive a function request 202 via network 104. For example, an application, such as application 102 in FIG. 1, may request the distributed processing of a map-reduce function targeting input data 222 stored in storage devices 140. Host 106 may return a function result 206 via network 104. For example, host 106 may store output data 226 in storage devices 140 and distribute it back through network 104 by a host distributed file write operation.

Host 106 may include a host processor 214 and a host memory 216. Processor 214 may include any type of processor or microprocessor that interprets and executes instructions. Memory 216 may include a random access memory (RAM) or another type of dynamic storage device that stores information and instructions for execution by processor 214 and/or a read only memory (ROM) or another type of static storage device that stores static information and instructions for use by processor 214 and/or any suitable storage element such as a hard disc or a solid state storage element.

Host 106 may also include a function processor 218 configured to execute one or more compute tasks related to function request 202. For example, function request 202 may identify a plurality of target input data units 222.1-222.n stored in one or more namespaces 220 in storage devices 140. Function request 202 may be configured as a map-reduce function and include a map function definition and input data identifiers for the map phase and a reduce function definition for combining the intermediate data, such as intermediate data 224, to generate output data 226. Function request 202 may designate host 106 as a master node for completing its assigned map-reduce function (even if the output data may ultimately be combined with the output of other hosts and even if additional processing, such as another reduce step or feeding the output to another map-reduce function, follows.

In some embodiments, function request 202 may also include a requested processing time 204 and function processor 218 may be further configured to determine an estimated processing time for the compute tasks that represent executing the map function against each data unit in the input data, such as input data units 222.1-222.n. If function processor 218 determines that the compute tasks cannot be completed by function processor 218 using host processor 214 and memory 216 within requested processing time 204, the compute tasks that cannot be completed using host processor 214 within requested processing time 204 may be identified as overflow compute tasks and host 106 may leverage the processing capabilities of master storage controller 130.1 and secondary storage controller 130.2 to share the load and complete all of the compute tasks within requested processing time 204. In some embodiments, as explained below, determining the host map tasks and the overflow map tasks may be executed by master storage controller 130.1.

In some embodiments, master storage controller 130.1 and secondary storage controller 130.2 may by storage interface controllers configured to provide redundant access to storage devices 140. For example, master storage controller 130.1 and secondary storage controller 130.2 may be part of a NVMe subsystem normally used for data exchange with storage devices 140, but their processing and memory resources may be used to perform map and reduce compute tasks in streaming fashion to reduce the host processing requirements while minimizing network workload by keeping the input data and function processing traffic within the subnetwork of host 106. In some embodiments, master storage controller 130.1 may be designated as the master node for coordinating the map compute tasks and secondary storage controller 130.1 may be designated as the reducer and progress monitor. In addition, a shared namespace may be designated in namespaces 220 to establish streaming of intermediate data from master storage controller 130.1 and/or function processor 218 to secondary storage controller 130.2.

In some embodiments, master storage controller 130.1 may be configured to evaluate the set of compute tasks corresponding to function request 202 and determine which compute tasks can be handled using the compute resources of master storage controller 130.1 and which compute tasks should be returned to function processor 218 in host 106. For example, master storage controller 130.1 may estimate the processing time for each compute task based on the host compute resources and the compute resources of master storage controller 130.1. It may determine, based on the requested processing time 204, whether it can process one or more overflow compute tasks to reduce the load on function processor 218 to the point where the remaining host compute tasks can be completed within the requested processing time. In some embodiments, master storage controller 130.1 may fetch or read input data units 222.1-222.n, retain the input data for overflow compute tasks, and return the input data for host compute tasks to function processor 218. For example, input data units 222.1, 222.2, and 222.3 may be designated as host compute tasks and sent to function processor 218 and input data unit 222.n may be retained by master storage controller 130.1 for processing.

Function processor 218 and master storage controller 130.1 may both generate intermediate data 224 as output from their respective compute tasks. For example, intermediate data from applying the map function to input data units 222.1, 222.2, and 222.3 may be generated by function processor 218 and intermediate data from applying the map function to input data unit 222.n may be generated by master storage controller 130.1. Intermediate data 224 may be the aggregate of the intermediate data generated by each compute task. Secondary storage controller 130.2 may be configured to access or receive intermediate data 224 for reduce function processing to generate output data 226. In some embodiments, a shared namespace for intermediate data 224 in namespaces 220 may be configured for reserved write access by master storage controller 130.1 and/or host 106 and configured for reserved read access by secondary storage controller 130.2 to establish a data streamer that receives intermediate data 224 and pushes it to secondary storage controller 130.2 for reduce function processing.

In some embodiments, secondary storage controller 130.2 may be configured to perform less intensive workload operations, such as reduce functions, and inform host 106 regarding progress of the compute tasks for function request 202. For example, as intermediate data 224 is received by secondary storage controller 130.2, secondary storage controller 130.2 may process intermediate data units from each compute task using the reduce function and identify each compute task as complete. In some embodiments, secondary storage controller 130.2 may send compute task complete notifications to host 106 to provide a progress monitor for the compute tasks and overall completion of function request 202. Secondary storage controller 130.2 may store output data 226 from the reduce function to namespaces 220. In some embodiments, the namespace receiving output data 226 may be configured to enable host 106 to use a host distributed file write to return output data 226 as function result 206. Secondary storage controller 130.2 may send an output function complete message to host 106 to notify host 106 when function processing is complete and output data 226 is available for return to the function requester, such as application 102 in FIG. 1.

Figure 3:
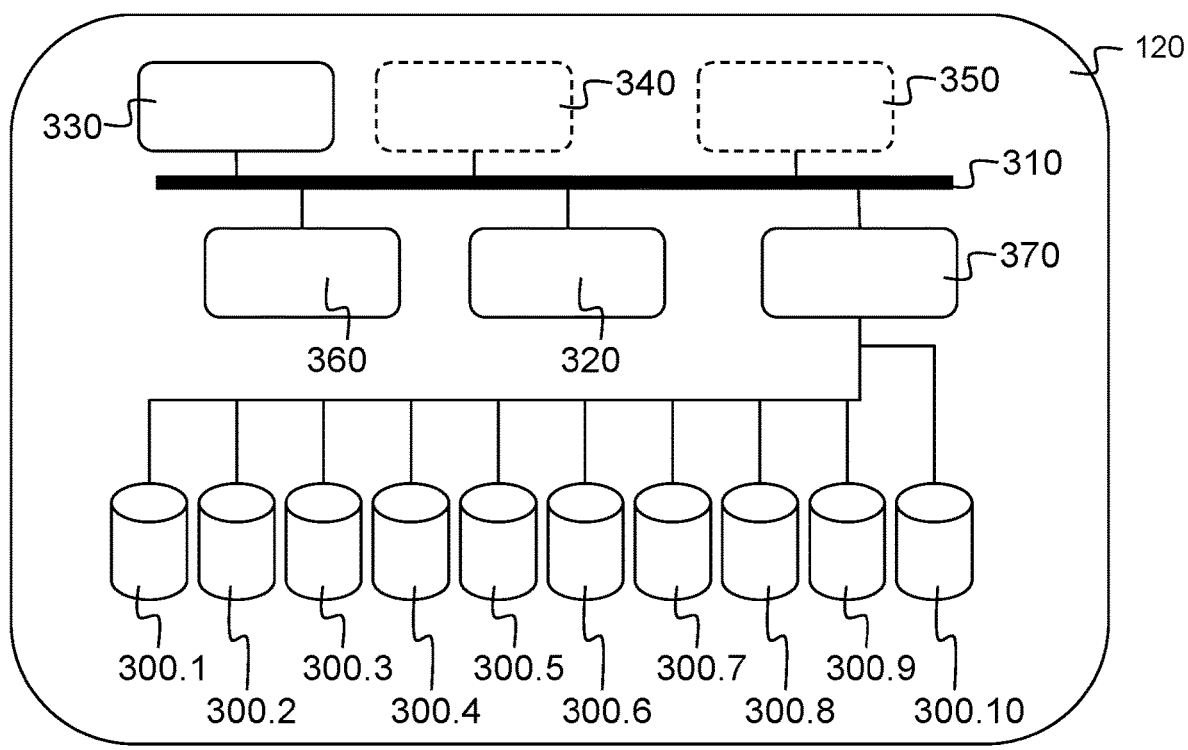
FIG. 3 schematically illustrates a storage node of the system of FIG. 1.

FIG. 3 shows a schematic representation of one of the storage nodes 120. Storage node 120 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of storage node 120. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 120 to communicate with other devices and/or systems, for example mechanisms for communicating with other storage nodes 120 or host nodes 106 such as for example two 1 Gb Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 TB SATA-II disk drives or 2 TB NVMe solid state drives (SSDs), and control the reading and writing of data to/from these storage elements 300. As shown in FIG. 3, such a storage node 120 could comprise ten 2 TB SATA-II disk drives as storage elements 300.1-300.10 and in this way storage node 120 would provide a storage capacity of 20 TB to the storage system 100.

The storage system 100 may comprises a plurality of storage elements 300. The storage nodes 120 each comprise a share of these storage elements 300. Each storage nodes 120 could comprise a similar amount of storage elements, but this is, however, not essential. Storage node 120 could for example comprise four, eight, ten, or any other number of storage elements appropriate to interface and form factor constraints. The storage system 100 may be operable to store and retrieve a data objects, data blocks, data files, or other data units comprising data, for example, 64 MB of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of BATA, PATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
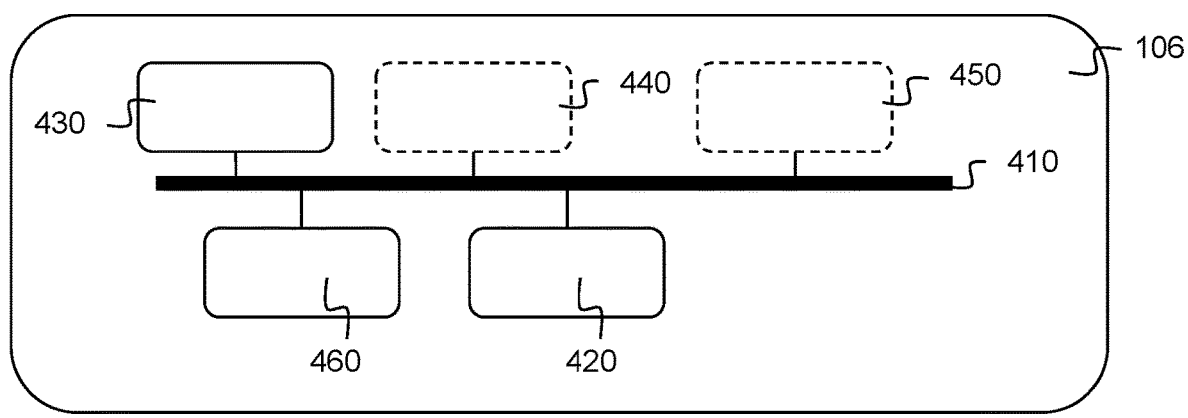
FIG. 4 schematically illustrates a host node of the distributed storage system of FIG. 1.

FIG. 4 shows a schematic representation of the host nodes 106. Host node 106 may comprise a bus 410, a processor 420, a local memory 430, one or more optional input units 440, one or more optional output units 450, and a communication interface 460. Bus 410 may include one or more conductors that permit communication among the components of host node 106. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said host node 106 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host node 106 to communicate with other devices and/or systems, for example mechanisms for communicating with other storage nodes 120 or host nodes 106 such as for example two 10 Gb Ethernet interfaces.

Figure 5:
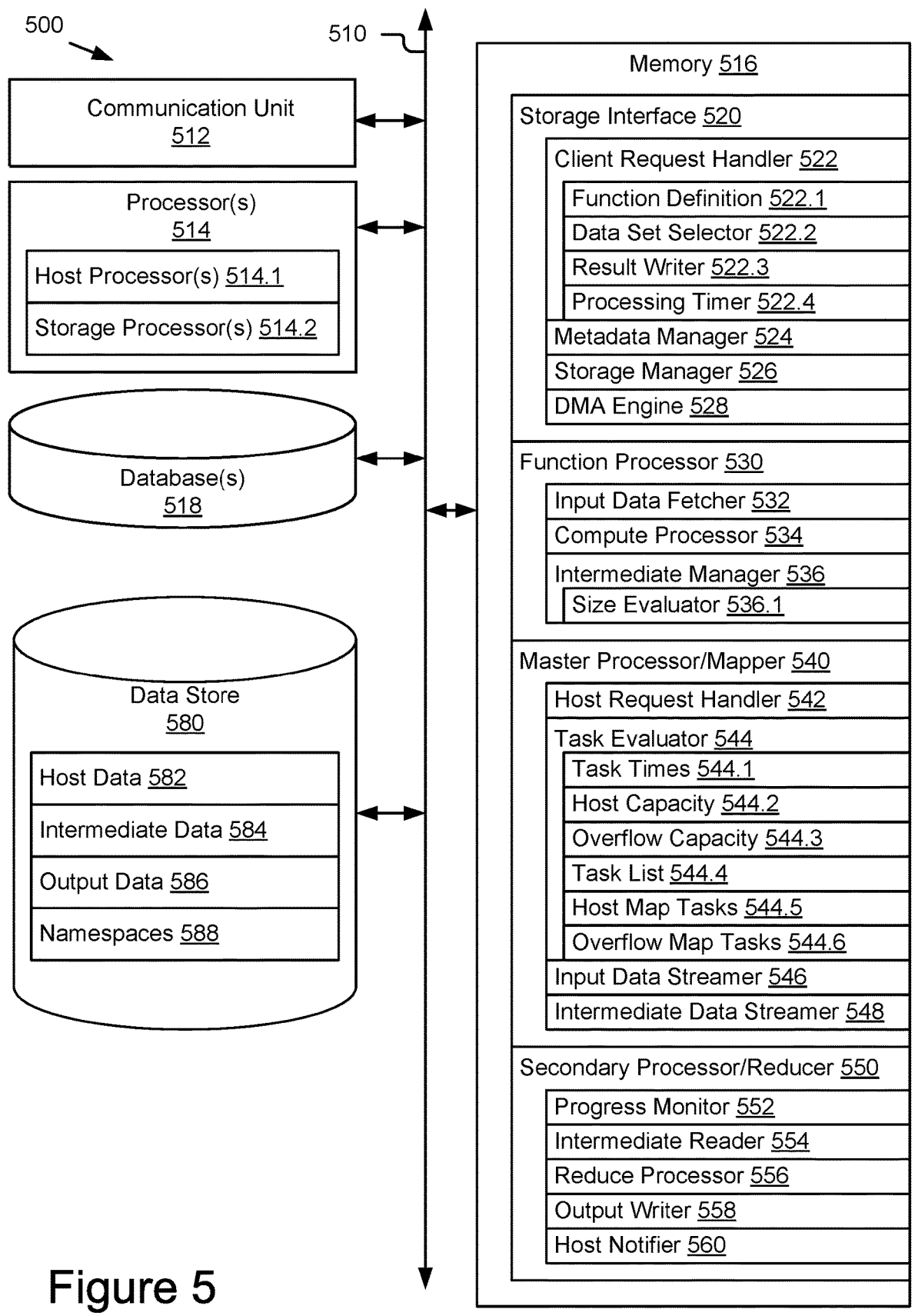
FIG. 5 schematically illustrates some elements of the nodes of FIG. 1-5 in more detail.

FIG. 5 schematically shows selected modules of a host node, storage node, and/or storage controller configured to use storage interface controller compute resources to assist with distributed function processing. Storage system 500 may be configured as a node with an architecture and/or hardware similar to host node 106 and/or storage node 120. Storage system 500 may incorporate elements and configurations similar to those shown in FIGS. 1-4. For example, storage system 500 may be configured in a host node 106 with additional mapper and reducer functions handled by storage controllers 130. In some embodiments, storage interface 520 and/or function processor 530 may be embodied in host nodes 106, master/mapper 540 and/or function processor 530 may be embodied in master storage controller 130.1, and secondary/reducer 550 may be embodied in secondary storage controller 130.2.

Storage system 500 may include a bus 510 interconnecting at least one communication unit 512, at least one processor 514, and at least one memory 516. Bus 510 may include one or more conductors that permit communication among the components of storage system 500. Communication unit 512 may include any transceiver-like mechanism that enables storage system 500 to communicate with other devices and/or systems. For example, communication unit 512 may include wired or wireless mechanisms for communicating with file system clients, other access systems, and/or one or more object storage systems or components, such as storage nodes or controller nodes. Processors 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element. In some embodiments, processors 514 and memory 516 may include a plurality of distinct compute resources associated with a host system and subcomponents thereof, such as storage interface controllers, where each component or subcomponent includes its own processor and memory resources. For example, processors 514 may include host processors 514.1 associated specifically with the host node and storage processors 514.2, embodied in storage node elements, such as storage interface controllers or storage devices.

Storage system 500 may include or have access to one or more databases 518 and/or specialized data stores, such as host data store 580. Databases may include one or more data structures for storing, retrieving, indexing, searching, filtering, etc. of structured and/or unstructured data elements. Host data store 580 may include host data units 582 stored for access and processing by distributed processing functions. For example, host data store 580 may include one or more collections of structured or unstructured data, such as media files, documents, software code, sensor data, data objects, etc. Host data units 582 may have been stored through host 106 and/or storage interface 520 and/or may have been stored through another storage interface into host data store 580. In some embodiments, host data units 582 may include data blocks, files, objects, or other addressable data units. In some embodiments, data store 580 may be organized in namespaces 588 with defined read and write access privileges and content or function. For example, each namespace may identify a configuration of nodes, users, owners, etc. with access privileges, authentication information, and specific read, write, delete, and similar types of access limitations. In some embodiments, namespaces 588 may be used to separate and provide different access configurations to host data units 582, intermediate data units 584, and output data units 586 to support distributed function processing.

Storage system 500 may include a plurality of modules or subsystems that are stored and/or instantiated in memory 516 for execution by processor 514. For example, memory 516 may include a storage interface 520 configured to receive, process, and respond to data and/or function requests from client applications, other host systems, and/or other nodes in storage system 100. Memory 516 may include a function processor 530 configured to process compute tasks related to function requests. Memory 516 may include a master processor or mapper 540 configured to allocate and execute overflow compute tasks. Memory 516 may include a secondary processor or reducer configured to execute reduce or other secondary compute tasks and monitor progress of function processing.

Storage interface 520 may include an interface protocol or set of functions and parameters for storing, reading, and otherwise managing data requests to data store 590. For example, storage interface 520 may include functions for reading, writing, modifying, or otherwise manipulating data blocks, objects, and/or files, as well as their respective client or host data and metadata in accordance with the protocols of an object, block, file, or other storage system. In some embodiments, storage interface 520 may further enable execution of data operations for data store 580. For example, storage interface 520 may include protocols and/or interfaces for receiving data function requests that may include defining functions, target data sets, and/or result formatting and delivery, as well as executing those functions against data store 580.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a direct memory access (DMA) engine. For any given client request, storage interface 520 may receive a client request through client request handler 522 and determine one or more operations based on the content of the request. These operations may include metadata operations handled by metadata manager 524 and/or data operations handled by storage manager 526, including encoding and decoding operations. In some embodiments, data processing operations may be handled by storage interface 520 by calling one or more other modules, such as function processor 530, mapper 540 and/or reducer 550. The results of these operations may be processed, formatted, and returned by client request handler 522. DMA engine 528 may support access to namespaces in data store 580 for supporting storage manager 526, function processor 530, mapper 540, and/or reducer 550

Client request handler 522 may include an interface and/or communication event-based condition for receiving data requests and/or operational commands from one or more clients or applications. For example, client systems may send a data request over a network connection and addressed to storage system 500 or a port or component thereof. Client request handler 522 may receive these requests and parse them according to the appropriate communication and storage protocols. For example, client request handler 522 may identify a transaction identifier, a client identifier, an object or location identifier (LBA, object name, GUID, etc.), a data operation, and additional parameters for the data operation, if any, from the received message or messages that make up the data request. Similarly, operational commands may include syntax and parameters for accessing data stored according to a specific block or file system. Operational commands may also relate to the execution of data functions by storage system 500.

In some embodiments, client request handler 522 may be configured for managing data operations to be executed by storage system 500. For example, a client system may be able to define one or more data functions, such as a map-reduce process, to be executed against a data set stored in data store 580 without transferring the data set to the client system (i.e., executing the host function on the data in the storage nodes close to the host node and only transferring the results to the client system). In some embodiments, data previously stored in data store 580 may be processed through at least one function (in a set of functions) by the storage node and/or storage device storing the target data blocks. For some host function request, an intermediate context may be generated and further processed within the storage node without returning the intermediate data to the client system or sending it to another host node.

Client request handler 522 may include one or more operations for managing data operation requests from a client system. For example, upon receiving a function request or command that relates to a data operation, client request handler 522 may identify the management operation and/or parse the components of a complete data function operation. In some embodiments, a complete data operation request may include request parameters for a function definition, a target data set, and a result format. Client request handler 522 may include a function definition module 522.1, a data set selector 522.2, a result writer 522.3, and/or processing timer 522.4 for identifying, determining, or otherwise parsing the parameters of the data operation request. In some embodiments, the request parameters may be passed to mapper 540 for managing the sharing of map compute tasks related to the function request and reducer 550 for managing the reduce compute tasks and progress monitoring.

In some embodiments, function definition module 522.1 may include an interface, function, or logic to receive and/or determine the set of functions to be used in a set of compute tasks for the data function operation. For example, the set of functions may include a function or set of parameters that may be applied to a subunit identification function for identifying data subunits. Example subunit identification functions might include logic for identifying sentences within a block of text, a frame of data within a video image file, or a shape within a graphics file. In some embodiments, a subunit identification function may include a set of subunit parameters that define the portions of a data unit that should be treated as a subunit for the purposes of the set of functions. The set of functions may include a map-function, which may provide logic for operating on a subunit to determine an intermediate context for that subunit. For example, the map-function may count the nouns in a sentence, the faces in a frame of video, or the vertices in a shape and return a numeric value or type-value pair for each parameter of the subunit being determined by the map-function. A map-function may be a parallel-function that allows each subunit to be processed independently or a serial-function where each intermediate context provides one or more values for use in applying the serial-function to the next subunit. The set of functions may include a reduce-function, which provides logic for providing an aggregate or result value for the intermediate contexts determined for each subunit. The set of functions may also include terminal conditions, such as values or parameters to seed another function (e.g., a map or reduce function) or conditions signaling a final subunit and a result-function. In some embodiments, function definition module 522.1 may include an API or user interface for receiving selections of function types and parameters and may be sent from a client system.

In some embodiments, data set selector 522.2 may include an interface, function, or logic to receive and/or determine target data set to be processed using the set of functions for a particular data operation. For example, data set selector 522.2 may define the bounds of a set of data using any physical or logical grouping appropriate to the particular set of functions. Data set selector 522.2 may be configured for the type of data stored in data store 580 and any metadata or storage location data that may be used to index the data. For example, data set selector 522.2 may be able to target a data block, data file, data object, set of data units defined by some selection criteria, a bucket, inode, or other logical volume, or a similar set of parameters for defining data of interest. As another example, data set selector 522.2 may be able to target a data file, a set of data files defined by some selection criteria, an inode or other logical volume, or a similar set of parameters for defining data of interest. As still another example, data set selector 522.2 may be able to target a physical storage location using a starting address and ending address, starting address and length, or similar boundary conditions that map to physical addresses or their contents. In some embodiments, data set selector 522.2 may define a total data set comprised of a plurality of data units, such as files, objects, or messages within the total data set. The plurality of data units may each be comprised of a plurality of subunits that may be the target of defined functions, such as map-functions. In some embodiments, data set selector 522.2 may include an API or user interface for receiving selections of data set parameters or identifiers that may be sent from a client system.

In some embodiments, result formatter 522.3 may include an interface, function, or logic to receive and/or determine the format of the results to be returned to a requesting system, such as a client or host system. For example, result formatter 522.3 may receive the result output from applying the set of functions to the target data set and format in accordance with the preferences of the requesting system, such as simplifying results to a fixed value, delta value, array of values, file, object, metadata table, etc. In some embodiments, a map-reduce function set may return a final reduce-result in a defined format. For example, the map-reduce function set may return a total number of words, sentences, and paragraphs in a large text file or text object for novel by formatting three numeric values preceded by appropriate tags in accordance with a defined syntax, such as comma separated values. A result may be returned for the total data set. In some embodiments, the result formatter may include parameters for a host distributed file write to return the results to the function requester and/or initiate a replication or other data management process. In some embodiments, result formatter 522.3 may include an API or user interface for returning result values to a client system.

In some embodiments, processing timer 522.4 may include an interface, function, or logic to receive and/or determine a requested processing time for the function request, estimate the capability of storage system 500 to meet the requested processing time, and monitor the actual processing time against the requested processing time. For example, the function request may include a time parameter for the processing time allotted to the function request in order to meet desired service levels and/or coordinate with parallel or concurrent processing of function requests on other host nodes. In some embodiments, processing timer 522.4 may initially estimate the capability of function processor 530 to execute the compute tasks for the function using only processors 514 associated with the host node. If the estimated time exceeds the available time according to the requested processing time, the requested processing time may be passed with function definitions and data set parameters to mapper 540 and/or reducer 550 to determine whether distribution of overflow compute tasks, reduce compute tasks, and/or function management tasks to storage controller compute resources may enable the requested processing time to be met.

Metadata manager 524 may include interfaces, functions, and/or parameters for creating, modifying, deleting, accessing, and/or otherwise managing object, block, or file metadata, such as metadata stored in a metadata store in databases 518 and/or data store 580. For example, when a new object, block, or file is written to data store 580, at least one new metadata entry may be created in the metadata store to represent parameters describing or related to the newly created data unit. Metadata manager 524 may generate and maintain metadata that enables metadata manager 524 to locate object, block, or file metadata within the metadata store. In some embodiments, metadata manager 524 may also manage metadata stored in data store 580 with the data objects, blocks, or files, such as metadata tags or headers. Metadata manager 524 may work in conjunction with storage manager 526 to create, modify, delete, access or otherwise manage metadata stored as tags or headers within data store 580.

Storage manager 526 may include interfaces, functions, and/or parameters for reading, writing, and deleting host data units 582 in data store 580. For example, PUT or write commands may be configured to write host data units to data store 580. GET or read commands may be configured to read data from data store 580. DELETE commands may be configured to delete data from data store 580, or at least mark a data object for deletion until a future garbage collection or similar operation actually deletes the data or reallocates the physical storage location to another purpose.

Other storage commands may be handled by storage manager 526. Storage commands processed by storage manager 526 may include parameters for accessing special functions and/or metadata resources stored with host or client data. Storage manager 526 may work in conjunction with metadata manager 524 for managing metadata, including versioning information. In erasure encoded systems, storage manager 526 may operate in conjunction with encoders, block spreaders, block clusterers, and decoders for encoding and decoding data objects in redundant and distributed data blocks in accordance with an erasure coding configuration or other data redundancy method. For example, storage manager 526 may use an encoder and block spreader to write data to data store 580 and use a block clusterer and decoder to read data from data store 580.

DMA engine 528 may include logic, protocols, and/or interfaces for providing direct memory access to memory using a defined DMA protocol, such as remote direct memory access (RDMA). RDMA protocols may enable data movement directly between fabric nodes, such as storage devices, storage interface controllers, and host nodes without higher-level data routing. RDMA protocols may be employed over fabric networks using Ethernet, fibre channel, and similar network technologies to enable DMA engine 528 to expose, allocate, and manage selective access to the buffer memory within a given storage device from fabric nodes outside of the storage device, such as peer storage devices. In some embodiments, DMA engine 528 may incorporate iWARP, RDMA over converged Ethernet (RoCE), or other RDMA standards.

Function processor 530 may include a set of functions and parameters for executing an assigned compute task that contributes to processing a host function request within the storage nodes without moving the input data back to the requesting host. For example, function processor 530 may identify target input data units, such as input data in host data units 582 in data store 580, and then process the input data through one or more data functions, such as user or host data processing functions received through client request handler 522. In some embodiments, function processor 530 may be implemented in association with each compute resource that may be used to process one or more compute tasks, such as the host processor and memory and the processors and memories for each storage interface controller in the storage node containing the target data units. For example, an instance of function processor 530 may use local memory 516, local processor 514, and local storage media of data store 580 to fetch input data, process the compute task, and store intermediates (or output data for reduce tasks) in parallel with other compute resources to share compute tasks. In some embodiments, function processor 530 may operate responsive to compute tasks and related input data fetched or received by function processor 530 from mapper 540.

User data processing functions may include data functions that operate on stored user data regardless of physical storage location, encoding, redundancy, encryption, and storage management functions used by the storage system to manage data storage. For example, user data processing functions may include data transformations, extractions, abstractions, feature identification, and other processes to support client application processing of data for applications like data analysis, artificial intelligence training, image processing, pattern recognition, etc.

In some embodiments, function processor 530 may include a plurality of hardware and/or software modules configured to use processor 514 and memory 516 to handle or manage defined operations of function processor 530. For example, function processor 530 may include an input data fetcher 532, a compute processor 534, and an intermediate manager 536.

Input data fetcher 532 may include functions, parameters, and/or logic for fetching a target input data unit, such as data blocks, data symbols, data objects, and/or a data frame within another data unit that is the target of the assigned compute task, for executing one or more functions against. For example, input data fetcher 532 may identify a target data unit for retrieval and processing from host data units 582 in data store 580 for the host function. In some embodiments, function processor 530 in the host node may initially use input data fetcher 532 to initiate data requests for the input data for all map compute tasks in the requested function. For example, upon receiving the function definition and data set parameters through client request handler 522, input data fetcher 532 may identify each input data set or data unit in host data units 582 and initiate a fetch or read operation through the storage node and master storage controller. In some embodiments, input data fetcher 532 for the host node may only receive a subset of the input data units related to host-assigned map tasks (as further described below). For example, the master storage controller and mapper 540 may divide the map compute tasks into host compute tasks and overflow compute tasks and only return the input data for the host compute tasks to input data fetcher 532 in the host node.

Compute processor 534 may include functions, parameters, and/or logic for processing the input data fetched by input data fetcher 532 in accordance with the functions and processing parameters in the compute configuration for the compute task. For example, compute processor 534 may receive a host function or a portion of a host function, such as a map function or another sub-function, targeting the selected input data. In some embodiments, compute processor 534 may be preconfigured with one or more standard host functions for processing specific data types, such as a portion of video or other media encoding or decoding algorithms, and the received compute configuration may indicate the selected host function and related parameters to be used for the compute task (without having to transfer the function itself). In some embodiments, compute processor 534 may execute compute task processing functions that include subunit processing functions configured to process or transform the data contents of a target subunit into an intermediate result to be stored and further processed by reducer 550. Compute processor 534 may return one or more intermediate data sets for storage by intermediate manager 536.

Intermediate manager 536 may include functions, parameters, and/or logic for storing intermediate results from the results of compute processor 534. For example, results of compute processor 534 may be stored to an intermediate namespace in data store 580 for further processing. In some embodiments, the compute configuration for the compute task may include a multi-step or iterative process for processing the input data that generates intermediate data that is aggregated and/or further processed using a reduce function after the compute task. In some embodiments, intermediate manager 536 may include a function for accessing or defining an intermediate namespace for receiving intermediate data. For example, intermediate manager 536 may allocate a namespace with write only capabilities in order to stream intermediate data units 584 to the namespace as compute processor 534 generates them. Reducer 550 may be configured with read only access to the intermediate namespace and stream intermediate data units 584 out of data store 580 for reduce function processing.

In some embodiments, intermediate manager 536 may include a size evaluator 536.1 function for determining whether to store one or more intermediate data units to data store 580 or send them directly to reducer 550. For example, host 106 and/or reducer 550 may have working memory and/or memory buffers for receiving messages from other nodes or subsystems with a memory size. If the intermediate data unit is less than the memory size, the intermediate data unit may be sent directly to reducer 550. If the intermediate data unit is larger than the memory size, it may be written to data store 580 for subsequent retrieval by reducer 550. Size evaluator 536.1 may determine one or more size thresholds, such as the memory size or similar thresholds for efficient processing and transfer of data, to use in evaluating whether the intermediate data units 584 are sent back to data store 580 or directly to reducer 550.

Mapper 540 may include a set of interfaces, functions, parameters, and data structures for enabling a storage node subsystem, such as a storage interface controller, to offload a portion of the host processing requirements for a given function request. For example, mapper 540 may allow a master storage controller to act as a master processor, using its own compute resources, and coordinate efficient sharing of compute tasks. In some embodiments, mapper 540 may be configured in the storage data path between the host storage interface 520 and/or function processor 530 and may be configured to receive the host data request to initiate compute task sharing. Mapper 540 may evaluate the compute tasks in the function request and determine a shared allocation of compute tasks between the host function processor 530 and additional instances of function processor 530 using other compute resources for overflow compute tasks. In some embodiments, mapper 540 may be configured with a more efficient process for managing the flow of intermediate data in conjunction with reducer 550 by streaming data through a shared namespace (and based on mapper 540 and reducer 550 being in close proximity to the storage devices of data store 580).

In some embodiments, mapper 540 may include a plurality of hardware and/or software modules configured to use processor 514 and memory 516 to handle or manage defined operations of mapper 540. For example, mapper 540 may include a host request handler 542, a task evaluator 544, an input data streamer 546, and an intermediate data streamer 548.

Host request handler 542 may include data structures, functions, and interfaces for receiving input data requests from the host node. For example, one or more fetch or read commands related the input data for the map compute tasks may be received and mapper 540 may parse or determine the number, size, and processing task time for the set of compute tasks. In some embodiments, host storage interface 520 and/or function processor 530 may be configured to send a host function request message to mapper 540 to initiate mapper 540 to act as master for sharing function processing. For example, host request handler 542 may receive function definitions or parameters, input data parameters, processing time estimates, and/or the requested processing time for the function request. In some embodiments, host request handler 542 may pass one or more function request parameters describing the set of compute tasks and the processing time requirements to task evaluator 544.

Task evaluator 544 may include data structures, functions, and interfaces for evaluating how compute tasks, such as map compute tasks, may be allocated across available compute resources. For example, task evaluator 544 may use estimated compute task times 544.1, host capacity 544.1, and/or overflow capacity 544.3 to allocate task list 544.4 between host map tasks 544.5 and overflow map tasks 544.6. In some embodiments, task evaluator 544 may be configured to determine estimated compute task times 544.1, in terms of processing capacity, such as operations, cycles, or other processing units, that may be evaluated for the relative processing capabilities of, for example, host processors 514.1 and storage processors 514.2. For example, task evaluator 544 may use task times 544.1 or similar values and adjust them for the greater processing capabilities of host processors 514.1 versus storage processors 514.2 to calculate host capacity 544.2 and overflow capacity 544.2 in terms of number of map compute tasks that can be handled within the requested processing time. In a system where host processors 514.1 have roughly three times the processing capacity of the storage processors 514.2, host capacity 544.2 may be three compute tasks while overflow capacity 544.3 for the storage processor 514.2 associated with mapper 540 may be one compute task. In some embodiments, the host node may provide estimated latencies for compute tasks that task evaluator 544 may use for task times 544.1 and/or host capacity 544.2.

In some embodiments, task evaluator 544 may determine compute task list 544.4 to include each discrete map function and target input data unit for the function request. For example, a map-reduce function request may identify four input data units to be processed through a map function. Based on host capacity 544.2 and overflow capacity 544.3, task evaluator 544 may commit each compute task from task list 544.4 to either host map tasks to be sent back to the host processors 514.1 or overflow tasks to be processed using storage processors 514.2. In some embodiments, task evaluator 544 may return a set of host compute tasks and a set of overflow compute tasks for input data streamer 546 to use in routing input data units.

Input data streamer 546 may include data structures, functions, and interfaces for moving input data units from data store 580 to host function processor 530 and master storage controller function processor 530. For example, responsive to determining the host compute tasks and the overflow compute tasks, input data streamer 546 may be configured to read input data units from host data units 582 and send them to their respective processors. In some embodiments, input data streamer 546 may generate a host queue of input data units for host map tasks 544.5 in response to the fetch or read requests from host input data fetcher 532 that host function processor 530 may process as resources are available. Input data streamer 546 may generate an overflow queue of input data units for overflow map tasks 544.6 for processing by a function processor associated with mapper 540. In some embodiments, input data streamer 546 may be configured one or more namespaces in namespaces 588 that include host data units 582 corresponding to the input data units.

Intermediate data streamer 548 may include data structures, functions, and interfaces for moving intermediate data units 584 from the function processor that generates them to data store 580. For example, intermediate data streamer 548 may store intermediate data units 584 to data store 580 as each intermediate data unit results from processing a corresponding input data unit through a selected map function in compute processor 534. In some embodiments, intermediate data streamer 548 may be configured to handle only intermediate data units generated by a function processor sharing the same processor 514 as mapper 540, such as a storage processor 514.2 for a master storage controller. For example, intermediate data streamer 548 may only handle intermediate data units from overflow compute tasks. In some embodiments, intermediate data streamer 548 may also receive intermediate data units generated by the host function processor and not sent directly to reducer 550. For example, intermediate data streamer 548 may also handle intermediate data units from host compute tasks. In some embodiments, an intermediate namespace may be defined in namespaces 588 and configured for reserving write access to mapper 540 for storing intermediate data units 584.

Reducer 550 may include a set of interfaces, functions, parameters, and/or data structures for enabling a storage node subsystem, such as a storage interface controller, to offload a portion of the host processing requirements for a given function request. For example, reducer 550 may allow a secondary storage controller to act as a reducer and process monitor, using its own compute resources, and support efficient sharing of compute tasks. In some embodiments, the function request may include map functions targeting input data from host data units 582 to generate intermediate data units 584 and a reduce function to aggregate and/or further process the intermediate data units 584 into an output data unit 586 for the function request. Reduce functions may be less processing intensive than map functions, requiring only a portion of the processing capability of processors 514 and responsive to completion of each of the map function compute tasks, so periodic in nature. These lower processing requirements and the use of intermediate data units to track progress of the map compute tasks may enable a secondary processor to effectively offload reduce compute tasks and progress monitoring from the host node. In addition, the proximity to the storage devices may enable efficient streaming of intermediate data units and configuration of output data for returning results to the function requester.

In some embodiments, reducer 550 may include a plurality of hardware and/or software modules configured to use processor 514 and memory 516 to handle or manage defined operations of reducer 550. For example, reducer 550 may include a progress monitor 552, an intermediate reader 554, a reduce processor 556, an output writer 558, and host notifier 560.

Progress monitor 552 may include data structures, functions, and interfaces for monitoring and reporting on the progress of the requested function. For example, progress monitor 552 may determine when compute tasks are complete based on reducer 550 receiving intermediate data units sent for processing through reducer 550. In some embodiments, progress monitor 552 may receive a compute task list and/or be configured to identify compute task identifiers from intermediate data units 584 received by reducer 550. For example, mapper 540 may provide compute task list 544.4. Intermediate data units may include tags or metadata identifying a compute task identifier, such as input data identifiers that are unique to a particular compute task. In some embodiments, function processor 530 may notify progress monitor 552 when a compute task is complete. For example, host function processor and/or overflow function process may send a compute task complete notification message to progress monitor 552. In some embodiments, progress monitor 552 may generate or maintain a data structure, such as a table or list, that identifies completed compute tasks. Progress monitor 552 may be configured to respond to progress queries from other nodes or subsystems to report complete compute tasks and/or incomplete compute tasks and/or send periodic status updates. In some embodiments, progress monitor 552 may include or access task times to estimate processing time remaining until a function request is complete. In some embodiments, progress monitor 552 may determine when all intermediate data units 584 have been received and processed through the reduce function and output data unit 586 is ready for return to the function requester.

Intermediate reader 554 may include data structures, functions, and interfaces for reading or otherwise receiving intermediate data units 584 for the requested function. For example, intermediate reader 554 may be configured to read intermediate data units 584 from data store 580 as they are stored there by function processor 530 and/or mapper 540. In some embodiments, intermediate reader 554 may be configured to access a shared intermediate namespace, where mapper 540 has reserved write access and intermediate reader 554 has reserved read access to enable efficient transfer of intermediate data units 584 as they are available and as soon as reducer 550 is able to process them. For example, intermediate data streamer 548 may establish an intermediate data queue that intermediate reader 554 pulls intermediate data units from as they are available. In some embodiments, intermediate reader 554 may be configured to receive intermediate data units directly from function processor 530 and/or mapper 540 without passing through data store 580.

Reduce processor 556 may include data structures, functions, and interfaces for processing reduce functions for the requested function to generate output data units 586. For example, reduce processor 556 may receive, as part of the function definition in the function request, a reduce function for processing the intermediate data from the map compute tasks. In some embodiments, reduce processor 556 may be preconfigured with one or more standard reduce functions for processing specific data types and map function output and the received compute configuration may indicate the selected reduce function and related parameters to be used for the reduce compute task (without having to transfer the function itself). In some embodiments, reduce processor 556 may execute reduce compute tasks on a data stream received by intermediate reader 554. In some embodiments, reduce processor 556 may execute reduce compute tasks responsive to receiving individual intermediate data units from any source. Reduce processor 556 may return one or more output data sets for storage by output writer 558.

Output writer 558 may include data structures, functions, and interfaces for storing output data units 586 in accordance with a process for returning results from function nodes in a distributed processing system. For example, the host node may be configured to provide function request results through a host distributed file write and output writer 558 may store output data units in a location and configuration in data store 580 to support that protocol for returning function results. In some embodiments, output data units 586 may also be replicated or otherwise managed for data security and reliability and output writer 558 may use compliant data formats and protocols for supporting such additional functions. In some embodiments, output writer 558 returns a set of output data units in an output namespace configured within namespaces 588.

Host notifier 560 may include data structures, functions, and interfaces for notifying the host node of completion of requested function processing and/or progress or status related thereto. For example, host notifier 560 may be triggered when output writer 558 completes writing output data units 586 to data store 580. In some embodiments, host notifier 560 generates and sends a function processing complete message to the host node, such as storage interface 520. In some embodiments, host notifier 560 may also support progress monitor 552 and provide requested and/or periodic updates during compute task processing to update the host node on completed and/or not yet completed compute tasks and related processing time. In some embodiments, host notifier 560 may include output data units 586 in the function processing complete message and/or provide a data location where output data units 586 may be accessed by the host node and/or other nodes.

Memory 516 may include additional logic and other resources (not shown) for processing data requests, such as modules for generating, queueing, and otherwise managing input/output data requests. Processing of a data request by storage interface 520 may include any number of intermediate steps that yield at least one data request to the storage system.

Figure 6:
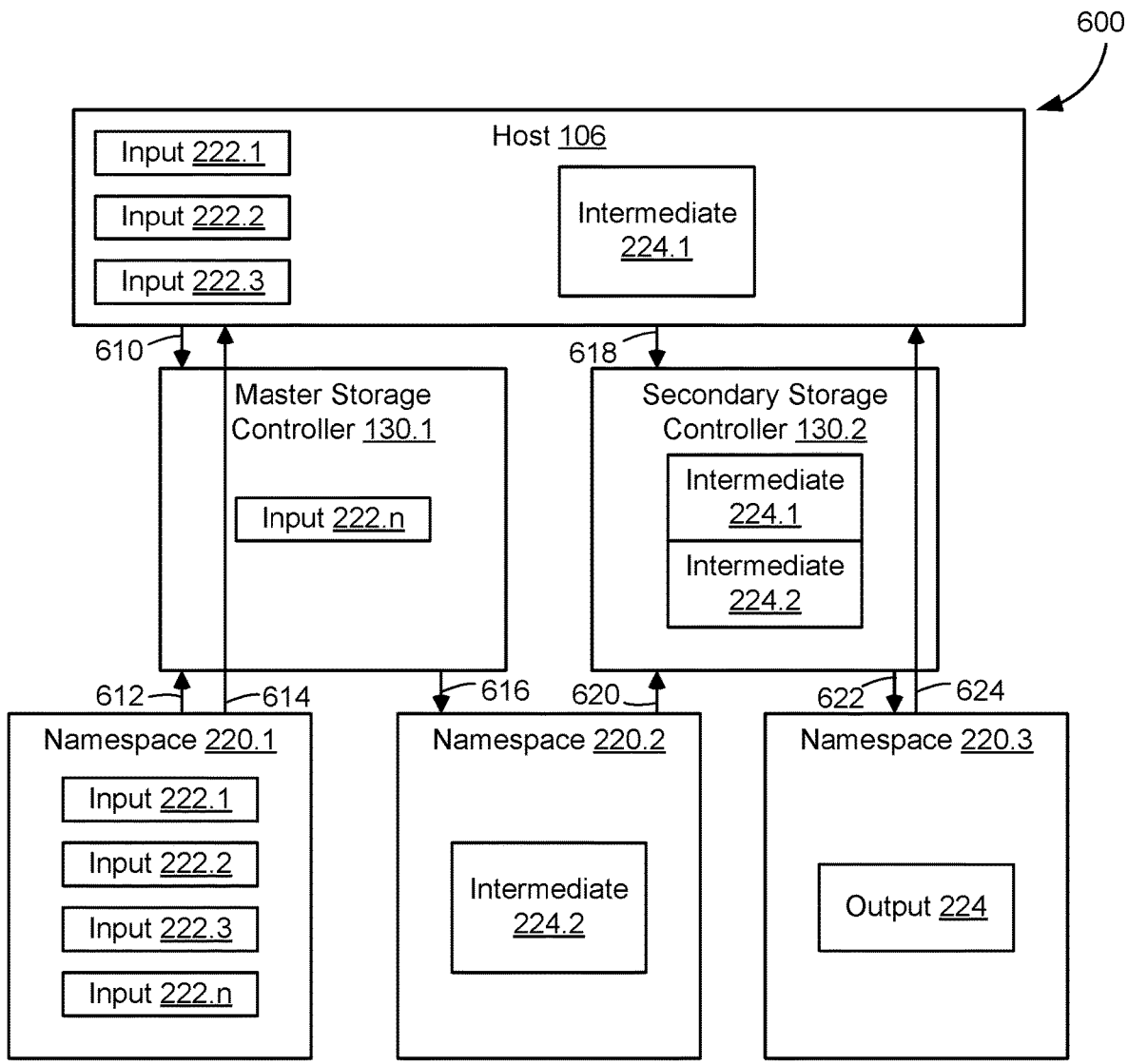
FIG. 6 schematically illustrates a host node and storage controller architecture for function processing that may be used by the systems of claims 1-5.

FIG. 6 shows a function processing storage system 600 configured and operated in accordance with some embodiments of FIGS. 1-5. A host 106 may be configured to use master storage controller 130.1 and secondary storage controller 130.2 to access one or more namespaces 220 in a data store for executing requested map-reduce functions. Host 106 may receive the function request and, at 610, pass the request to a storage node subsystem, such as the NVM interface subsystem. After receiving the function request from the host 106, master storage controller 130.1 may be maintained as master and secondary storage controller 130.2 may be maintained as secondary.

Master storage controller 130.1 may evaluate what input data units can be processed by master storage controller 130.1 in a similar time frame as host 106. In the example function shown, input data units 222.1, 222.2, 222.3, and 222.n each correspond to a map compute task for the map-reduce function. At 612, all input data units 222.1-222.n may be provided to master storage controller 130.1 (as the data access path for host 106) from host data namespace (or namespaces) 220.1. Master storage controller 130.1 may determine to keep a partial load, such as input data unit 222.n, as an overflow compute task, and send the remaining load, such as input data units 222.1, 222.2, and 222.3 to host node 106 at 614 as host compute tasks.

Host 106 and master storage controller 130.1 may process their respective input data units using the map function as compute tasks. At 616, host 106 and master storage controller 130.1 may write their intermediate data 224.1 (host task intermediate data) and 224.2 (overflow task intermediate data) to shared namespace 220.2. However, in the example shown, intermediate data 224.1 may be determined to be small enough that it is provided directly to secondary storage controller 130.2 at 618. At 620, secondary storage controller 130.2 may read and perform reduce operations in a streaming fashion from shared namespace 220.2. In some embodiments, shared namespace 220.2 may be reserved to master storage controller 130.1 for write operations and secondary storage controller 130.2 for read operations.

Secondary storage controller 130.2 may execute the reduce function against intermediate data 224.1 and 224.2 (collectively function intermediate data). At 622, function output data 226 may be stored to namespace 220.3. At 624, processed output data 226 may be directly taken as a distributed file system write. A notification may also be sent to host 106 to trigger further data management actions, such as replication. In the example shown, none of the input data units 222, including overflow input data unit 222.n, and no intermediate data 224 is sent to the host network to complete the requested map-reduce function. The storage node may have control over intermediate data blocks and control memory use per the intermediate data requirements.

Figure 7:
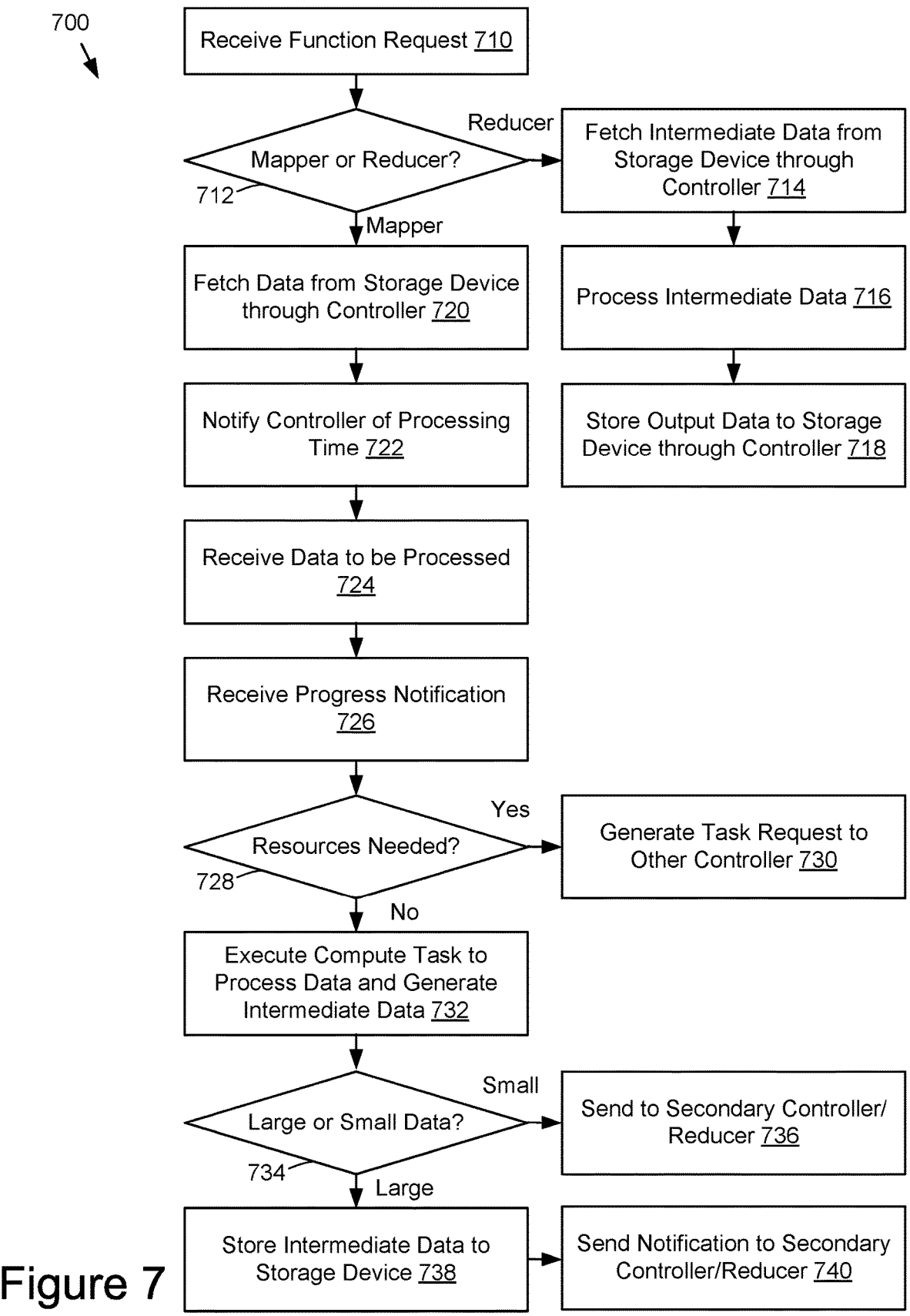
FIG. 7 is a flowchart of an example method of host offloading of compute tasks to storage controllers.

As shown in FIG. 7, storage system 500 may be operated according to an example method of host offloading of compute tasks to storage controllers, i.e. according to method 700 illustrated by blocks 710-740 in FIG. 7.

At block 710, a function request may be received at a host node. For example, a client application may send a map-reduce function request indicating a mapper or reducer role for the host node.

At block 712, whether the function request is for a mapper or reducer role may be determined. For example, the function request may include a role identifier for the assigned host node and a client request handler may parse the request to determine the role. If the role is reducer, method 700 may proceed to block 714. If the role is mapper, method 700 may proceed to block 720.

At block 714, intermediate data may be fetched from storage devices through a controller. For example, the host may have sufficient processing for reducer tasks and may not need to access the compute resources of the storage controllers. The host may fetch the intermediate data from the storage devices using a conventional data path through the controller(s).

At block 716, the intermediate data may be processed. For example, the host may use its function processor and host processor resources to execute the reduce function against the intermediate data.

At block 718, the output data may be stored to the storage devices through the storage controllers. For example, the host may store the intermediate data to the storage devices using a conventional data path through the controller(s).

At block 720, input data may be fetched from the storage devices through the controllers. For example, the host may initiate a read request through a master storage controller for the input data needed for each compute task for the requested map function.

At block 722, the storage controller may be notified of the processing time for the map functions. For example, the host may pass a requested processing time and information regarding estimated latencies to the master storage controller.

At block 724, input data for a host subset of the compute tasks may be received. For example, the master storage controller may determine the compute tasks that can be completed by the host processor within the requested processing time and only send the input data for the compute tasks the host can be expected to complete in time (withholding the input data for any overflow compute tasks).

At block 726, progress notifications may be received from the controllers. For example, a secondary storage controller may monitor intermediate data and progress through the compute tasks for completing the requested function and periodically report completed compute tasks to the host node.

At block 728, whether additional resources are needed may be evaluated. For example, the host node may use the progress notification and/or compute task estimates to determine whether the storage controllers can handle the overflow compute tasks within the requested processing time. If yes, more resources are needed and method 700 may proceed to block 730. If no, the storage controllers have sufficient compute resources for the overflow and method 700 may proceed to block 732.

At block 730, an overflow compute task request may be generated another storage controller. For example, the host may have access to more than two storage controllers and may be able to recruit additional compute resources similar to the function processor in the master storage controller for additional map compute tasks. In some embodiments, the compute resources of more than two storage controllers may be recruited for overflow compute tasks.

At block 732, host compute tasks may be executed to process the input data and generate intermediate data. For example, a function processor in the host may execute each host compute task for which it received input data and generate resulting intermediate data.

At block 734, whether the intermediate data is smaller or larger than a size threshold may be evaluated. For example, the size of each intermediate data unit may be compared against the memory resources of the host node and/or secondary storage controller to determine whether the intermediate data can be provided directly to the reducer or needs to be stored back to the storage devices. If small, method 700 may proceed to block 736. If large, method 700 may proceed to block 738.

At block 736, intermediate data may be sent to the secondary storage controller or reducer. For example, the host and secondary storage controller may have sufficient memory resources to directly transfer the intermediate data for reduce processing and the host may send the intermediate data directly to the secondary storage controller.

At block 738, intermediate data may be stored to the storage devices. For example, the host or secondary storage controller may have insufficient memory resources to directly transfer the intermediate data and may temporarily store the intermediate data to the storage devices instead.

At block 740, a notification may be sent to the secondary storage controller or reducer. For example, storage of the intermediate data at block 738 may generate a notification message to the secondary storage controller to initiate streaming of the intermediate data for reduce processing.

Figure 8:
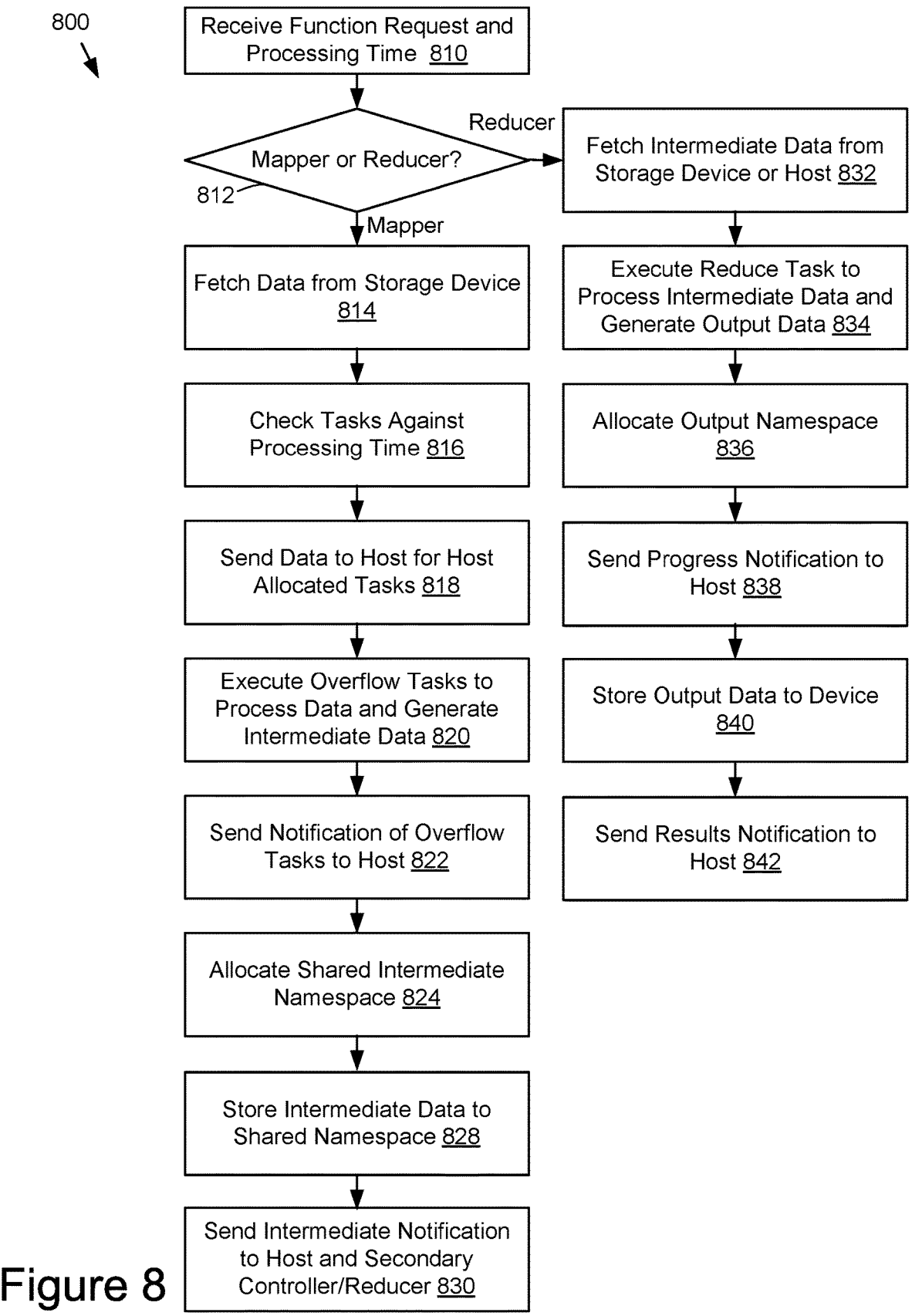
FIG. 8 is a flowchart of an example method of storage controller management of offloaded compute tasks from a host.

As shown in FIG. 8, storage system 500 may be operated according to an example method of storage controller management of offloaded compute tasks from a host, i.e. according to method 800 illustrated by blocks 810-842 in FIG. 8.

At block 810, a function request and requested processing time may be received by a storage controller. For example, a master storage controller and a secondary storage controller may receive the function request and information regarding requested processing time and expected latency for compute tasks.

At block 812, whether the storage controller will be acting in the mapper or reducer role may be determined. For example, the master storage controller may take on the master and mapper role and the secondary storage controller may take on the reducer role. If mapper, the method 800 proceeds to block 814. If reducer, method 800 proceeds to block 832.

At block 814, input data may be fetched from the storage devices. For example, the master storage controller may read the input data for all map compute tasks from one or more storage devices, such as host data namespace in one or more storage devices.

At block 816, the compute tasks may be checked against the requested processing time. For example, the set of map compute tasks for the requested function may be evaluated based on their estimated processing times for the host processor and the storage controller processors.

At block 818, input data for host allocated compute tasks may be sent to the host. For example, the master storage controller may determine a host subset of compute tasks that should be able to be completed by the host processor in the requested processing time and send only the input data for the host subset of compute tasks.

At block 820, overflow compute tasks may be executed to process the input data and generate intermediate data. For example, the master storage controller may retain the input data for one or more compute tasks allocated as overflow compute tasks and use the storage controller compute resources to process the input data using the map function to generate corresponding intermediate data.

At block 822, a notification of overflow tasks may be sent to the host. For example, the master storage controller may determine the subset of host compute host tasks sent at block 818 and the subset of overflow compute tasks to be processed by storage controllers and notify the host. In some embodiments, additional overflow tasks that cannot be handled by the master storage controller may be allocated to other storage controllers by the host for generating intermediate data to be stored for processing by the reducer.

At block 824, a shared namespace may be allocated for transferring intermediate data from mappers and the reducer. For example, the master storage controller may define an intermediate namespace shared by all storage controllers participating in the function request and reserve write access to mappers and read access to the reducer.

At block 828, the intermediate data may be stored in the shared namespace. For example, the master storage controller (and any other storage controllers executing overflow compute tasks) may store the intermediate data from each overflow compute task in the shared intermediate namespace. In some embodiments, the host may also store intermediate data from the host subset of compute tasks in the shared intermediate namespace, such as through the master storage controller.

At block 830, an intermediate notification may be sent to the host and/or secondary controller/reducer. For example, responsive to completing each overflow compute task and storing the intermediate data, the master storage controller may send a notification to the host or reducer to initiate processing of the intermediate data through the reduce function.

At block 832, intermediate data may be fetched from the storage devices or host. For example, the secondary storage controller may read or stream the intermediate data stored in the shared intermediate namespace and/or the host may send intermediate data directly to the secondary storage controller.

At block 834, reduce compute tasks may be executed to process the intermediate data and generate output data. For example, the secondary storage controller may execute the reduce function against intermediate data streamed from the shared intermediate namespace and/or received directly from other controllers or the host.

At block 836, an output namespace may be allocated. For example, the secondary storage controller may allocate an output namespace in the storage devices to enable transfer of output data by the host in a distributed file system write and/or replication process.

At block 838, progress notifications may be sent to the host. For example, the secondary storage controller may periodically or as requested send progress notifications regarding the complete and/or incomplete compute tasks and/or estimated time to complete the requested function.

At block 840, output data may be stored to the storage devices. For example, the secondary storage controller may store the output data from the reduce compute tasks to the output namespace allocated at block 836.

At block 842, a results or function request complete notification may be sent to the host. For example, the secondary storage controller may send a function complete notification that identifies the output data (directly or by location) for the host include in a results message or process to the function requester.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a host processor configured to:
    receive a function request for processing data from at least one storage device, the function request including a plurality of compute tasks;
    fetch, from the at least one storage device, input data for a first subset of the plurality of compute tasks;
    execute the first subset of the plurality of compute tasks; and
    return, based on the plurality of compute tasks, a function result; and
a first storage controller comprising:
    a first controller processor configured to execute a second subset of the plurality of compute tasks; and
    a storage device interface to a plurality of storage devices, including the at least one storage device, wherein the first storage controller is configured to:
        fetch, from the at least one storage device, the input data for the plurality of compute tasks through the storage device interface;

send, to the host processor, the input data for the first subset of the plurality of compute tasks; and
process the input data for the second subset of the plurality of compute tasks.

2. The system of claim 1, wherein the first storage controller is further configured to:
receive a requested processing time; and
determine the second subset of the plurality of compute tasks based on:
excluding the first subset of the plurality of compute tasks; and
a requested processing time for the function request.

3. The system of claim 2, wherein the host processor is further configured to:
receive, with the function request, the requested processing time;
determine, based on the requested processing time, the first subset of the plurality of compute tasks; and
send, to the first storage controller:
the requested processing time; and
the first subset of the plurality of compute tasks.

4. The system of claim 1, wherein each of the plurality of compute tasks operates on a data unit of the input data from a first namespace.

5. The system of claim 1, wherein:
the first storage controller is further configured to:
fetch the input data from a first namespace; and
store, responsive to executing the second subset of the plurality of compute tasks, overflow task intermediate data in a second namespace; and
the host processor is further configured to store, responsive to executing the first subset of the plurality of compute tasks, host task intermediate data in the second namespace.

6. The system of claim 1, further comprising:
a second storage controller configured to:
provide access to the at least one storage device for the host processor;
fetch function intermediate data generated from the plurality of compute tasks;
execute, using the function intermediate data, at least one reduce compute task to generate function output data; and
store the function output data in the at least one storage device, wherein the function result returned by the host processor is based on the function output data.

7. The system of claim 6, wherein:
the first storage controller is further configured to store, responsive to executing the second subset of the plurality of compute tasks, overflow task intermediate data in a second namespace;
the host processor is further configured to store, responsive to executing the first subset of the plurality of compute tasks, host task intermediate data in the second namespace; and
the function intermediate data includes:
the overflow task intermediate data; and
the host task intermediate data.

8. The system of claim 7, wherein:
the second storage controller is further configured to:
store the function output data in a third namespace; and
send an output data notification to the host processor; and
the host processor is further configured to return, responsive to the output data notification, the function result using the function output data in the third namespace.

9. The system of claim 6, wherein:
executing the first of the plurality of compute tasks generates host task intermediate data;
the host processor is further configured to:
evaluate a size of the host task intermediate data against a size threshold;
selectively store, responsive to the size threshold being met, the host task intermediate data to the at least one storage device; and
selectively send, responsive to the size threshold not being met, the host task intermediate data to the second storage controller; and
the function intermediate data includes the host task intermediate data.

10. The system of claim 6, wherein:
the first storage controller is configured as a master non-volatile memory express controller for accessing a shared namespace in the at least one storage device;
the second storage controller is configured as a secondary non-volatile memory express controller for accessing the shared namespace in the at least one storage device;
the plurality of compute tasks are map tasks for a map-reduce function;
each of the plurality of compute tasks operates on a data unit of the input data from the shared namespace; and
the second storage controller is further configured to send, responsive to receiving intermediate data for each compute task of the plurality of compute tasks, a progress notification to the host processor.

11. A computer-based method, comprising:
receiving, at a host processor, a function request for processing data from at least one storage device, the function request including a plurality of compute tasks;
accessing, though a first storage controller, at least one storage device;
fetching, by the host processor and from a first namespace in the at least one storage device, input data for a first subset of the plurality of compute tasks;
executing, by the host processor, the first subset of the plurality of compute tasks;
storing, responsive to executing the first subset of the plurality of compute tasks, host task intermediate data in a second namespace in the at least one storage device;
fetching, to the first storage controller and from the first namespace, input data for a second subset of the plurality of compute tasks;
executing, by the first storage controller, the second subset of the plurality of compute tasks;
storing, responsive to executing the second subset of the plurality of compute tasks, overflow task intermediate data in the second namespace; and
returning, based on the host task intermediate data and the overflow task intermediate data, a function result.

12. The computer-based method of claim 11, further comprising:
receiving a requested processing time for the function request; and
determining the second subset of the plurality of compute tasks based on:
excluding the first subset of the plurality of compute tasks; and
the requested processing time for the function request.

13. The computer-based method of claim 12, further comprising:
determining, based on the requested processing time, the first subset of the plurality of compute tasks.

14. The computer-based method of claim 11, further comprising:
  fetching, from the at least one storage device and to the first storage controller, the input data for the plurality of compute tasks; and
  sending, from the first storage controller to the host processor, the input data for the first subset of the plurality of compute tasks.

15. The computer-based method of claim 11, further comprising:
  executing, using the host task intermediate data and the overflow task intermediate data, at least one reduce compute task to generate the function result.

16. The computer-based method of claim 11, further comprising:
  providing, from a second storage controller, access to the at least one storage device for the host processor;
  fetching, by the second storage controller, function intermediate data generated from the plurality of compute tasks;
  executing, by the second storage controller and using the function intermediate data, at least one reduce compute task to generate function output data; and
  storing the function output data in the at least one storage device, wherein the function result returned is based on the function output data.

17. The computer-based method of claim 16, wherein the function intermediate data includes:
  the overflow task intermediate data; and
  the host task intermediate data.

18. The computer-based method of claim 17, further comprising:
  storing the function output data in a third namespace;
  sending, by the second storage controller, an output data notification to the host processor; and
  returning, responsive to the output data notification, the function result using the function output data in the third namespace.

19. The computer-based method of claim 16:
  wherein
    the function intermediate data includes the host task intermediate data; and
  further comprising:
    evaluating a size of the host task intermediate data against a size threshold;
    selectively storing, responsive to the size threshold being met, the host task intermediate data to the at least one storage device; and
    selectively sending, responsive to the size threshold not being met, the host task intermediate data to the second storage controller.

20. A system, comprising:
  a host processor;
  a plurality of storage devices;
  a first storage controller configured for the host processor to access data on the plurality of storage devices;
  a second storage controller configured for the host processor to access data on the plurality of storage devices;
  means for receiving, at the host processor, a function request for processing data from at least one storage device, the function request including a plurality of compute tasks;
  means for fetching, by the host processor and from the at least one storage device, input data for a first subset of the plurality of compute tasks;
  means for executing, by the host processor, the first subset of the plurality of compute tasks;
  means for executing, by the first storage controller, a second subset of the plurality of compute tasks;
  means for fetching, by the second storage controller, function intermediate data generated from the plurality of compute tasks;
  means for executing, by the second storage controller and using the function intermediate data, at least one reduce compute task to generate function output data;
  means for storing the function output data in the at least one storage device; and
  means for returning a function result based on the function output data.

* * * * *